United States Patent
Ito et al.

(10) Patent No.: US 9,923,438 B2
(45) Date of Patent: Mar. 20, 2018

(54) METHOD FOR MANUFACTURING A ROTARY ELECTRIC MACHINE

(71) Applicant: MITSUBISHI ELECTRIC CORPORATION, Chiyoda-ku, Tokyo (JP)

(72) Inventors: Shinichi Ito, Tokyo (JP); Sachiko Kawasaki, Tokyo (JP); Yu Hirotani, Tokyo (JP); Masatsugu Nakano, Tokyo (JP); Toyoaki Udo, Tokyo (JP); Hiroyuki Matsuo, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 215 days.

(21) Appl. No.: 14/779,445

(22) PCT Filed: Mar. 4, 2014

(86) PCT No.: PCT/JP2014/055375
§ 371 (c)(1),
(2) Date: Sep. 23, 2015

(87) PCT Pub. No.: WO2014/192350
PCT Pub. Date: Dec. 4, 2014

(65) Prior Publication Data
US 2016/0056696 A1    Feb. 25, 2016

(30) Foreign Application Priority Data
May 28, 2013 (JP) ................. 2013-111706

(51) Int. Cl.
*H01F 7/06* (2006.01)
*H02K 15/085* (2006.01)
(Continued)

(52) U.S. Cl.
CPC .......... *H02K 15/085* (2013.01); *H02K 1/165* (2013.01); *H02K 3/12* (2013.01); *H02K 15/04* (2013.01); *H02K 2213/03* (2013.01)

(58) Field of Classification Search
CPC ............ H02K 3/46; H02K 3/314; H02K 3/52; H02K 15/028; H02K 15/067; H02K 15/085; H02K 15/15
See application file for complete search history.

(56) References Cited

U.S. PATENT DOCUMENTS 5,350,960 A * 9/1994 Kiri .......................... H02K 1/16
310/194
5,735,706 A * 4/1998 Ito ......................... H01R 4/2462
439/402

(Continued)

FOREIGN PATENT DOCUMENTS

EP    1 416 610 A1    5/2004
GB    2491573 A    12/2012

(Continued)

OTHER PUBLICATIONS

Office Action (Notice of Reasons for Rejection) dated Sep. 13, 2016, by the Japanese Patent Office in corresponding Japanese Patent Application No. 2015-519696 and partial English translation of the Office Action. (7 pages).

(Continued)

*Primary Examiner* — Paul D Kim
(74) *Attorney, Agent, or Firm* — Buchanan Ingersoll & Rooney PC

(57) ABSTRACT

A stator core includes an inner ring core composed of a plurality of teeth arranged in the circumferential direction and a connection portion connecting inner circumferential portions of the plurality of teeth; and an outer ring core to be joined to an outer circumferential surface of the inner ring core. Slots of the stator core each have a circumferential (Continued)

direction width (a) on an inner circumference side smaller than a circumferential direction width (b) on an outer circumference side. A stator coil composed of conductive coils including a plurality of slot accommodated portions and a plurality of coil end portions connecting the slot accommodated portions is inserted and placed in the slots from an outer side in the radial direction of the inner ring core.

4 Claims, 19 Drawing Sheets

(51) Int. Cl.
  *H02K 1/16* (2006.01)
  *H02K 3/12* (2006.01)
  *H02K 15/04* (2006.01)

(56) References Cited

U.S. PATENT DOCUMENTS

| 6,046,518 | A | * | 4/2000 | Williams | B60K 7/0007 310/114 |
| 6,087,755 | A | * | 7/2000 | Suzuki | H02K 1/148 310/180 |
| 6,373,164 | B1 | | 4/2002 | Nishimura | |
| 7,256,521 | B2 | * | 8/2007 | Fukasaku | H02K 3/12 310/179 |
| 7,554,226 | B2 | * | 6/2009 | Kojima | H02K 3/524 310/156.36 |
| 8,847,075 | B2 | * | 9/2014 | Ikeda | H01B 3/306 174/110 N |
| 8,933,607 | B1 | * | 1/2015 | Gabrys | H02K 21/14 310/179 |
| 2005/0082924 | A1 | | 4/2005 | Fukasaku et al. | |
| 2005/0116572 | A1 | | 6/2005 | Fukasaku et al. | |
| 2008/0136284 | A1 | | 6/2008 | Fujii et al. | |
| 2010/0251796 | A1 | | 10/2010 | Akimoto et al. | |
| 2010/0320864 | A1 | | 12/2010 | Rahman et al. | |
| 2012/0326552 | A1 | | 12/2012 | Kinpara et al. | |

FOREIGN PATENT DOCUMENTS

| JP | 61-240832 A | 10/1986 |
| JP | 63234851 A * | 9/1988 |
| JP | H02-261025 | 10/1990 |
| JP | 02-285953 A | 11/1990 |
| JP | 2000-224788 A | 8/2000 |
| JP | 2001-218439 A | 8/2001 |
| JP | 2007-288848 A | 11/2007 |
| JP | 2007-325447 A | 12/2007 |
| JP | 2008-148480 A | 6/2008 |
| JP | 2010-263771 A | 11/2010 |
| JP | 5011152 B2 | 8/2012 |
| JP | 2012-222983 A | 11/2012 |
| JP | 2013-005683 A | 1/2013 |
| WO | WO 2008/044703 A1 | 4/2008 |
| WO | 2011/155327 A1 | 12/2011 |

OTHER PUBLICATIONS

Office Action (Notice of Reasons for Rejection) dated Mar. 15, 2016, by the Japanese Patent Office in corresponding Japanese Patent Application No. 2015-519696 (7 pgs).

International Search Report (PCT/ISA/210) dated Jun. 3, 2014, by the Japanese Patent Office as the International Searching Authority for International Application No. PCT/JP2014/055375.

Extended European Search Report dated Feb. 16, 2017, issued by the European Patent Office in corresponding European Application No. 14804684.0. (11 pages).

Office Action dated May 4, 2017 in corresponding Chinese Patent Application No. 201480026979.8, and a partial English translation thereof.

* cited by examiner (A)  (B)

(A)

(B)

(A)          (B)

METHOD FOR MANUFACTURING A ROTARY ELECTRIC MACHINE

TECHNICAL FIELD

The present invention relates to a rotary electric machine and a manufacturing method therefor, and particularly, to a stator of the rotary electric machine, and aims at enhancing efficiency and output of the rotary electric machine and improving assembly performance thereof.

BACKGROUND ART

As background art for enhancing efficiency and output of a rotary electric machine, for example, Patent Document 1 is proposed. In Patent Document 1, a width adjustment portion is provided so that the circumferential direction width of each slot between stator teeth is narrowed inwardly in the radial direction, thereby reducing a difference in magnetic resistance in the radial direction of each tooth, and enhancing performance of the rotary electric machine.

In order to enable insertion into the slot having the width adjustment portion, a stator coil is substantially formed into a U shape so as to have two straight portions and a connection portion connecting them, a cross section of each straight portion of the stator coil is shaped into a shape along the width adjustment portion, and both radial direction ends of the straight portion are shaped into a shape along a direction perpendicular to the radial direction. Then, the stator coil is inserted and placed in the slot from the axial direction thereof. Thus, a gap between the stator coil and the slot is narrowed, whereby a space factor of a stator can be improved.

CITATION LIST

Patent Document

Patent Document 1: Japanese Laid-Open Patent Publication No. 2013-005683

SUMMARY OF THE INVENTION

Problems to be Solved by the Invention

A stator coil of Patent Document 1 is formed by connecting a plurality of unit conductors each of which is a conductor formed substantially in a U shape so as to have two straight portions and a connection portion connecting them. In this configuration, since the number of the straight portions is two, the number of the conductors needs to be (number of slots×number of turns) of the stator/2. Thus, the number of conductors composing the stator coils increases, and assembly performance of the stator is deteriorated. With increase in the number of conductors, the number of connection points at which the conductors are connected to each other also increases. As a result, reliability of the stator is also deteriorated. Further, the size of the stator increases.

In attachment of the stator coil to a stator core, the conductor is moved substantially in parallel with the axial direction of the stator center axis, whereby the straight portion is inserted and placed in the slot. In this configuration, a conductor to be inserted later needs to be inserted and placed while striding over a conductor already inserted. As a result, a coil end of the stator becomes high, and the size of the stator increases. In addition, since the amount of a used conductive wire increases, electric resistance of the coil increases and efficiency of the rotary electric machine is deteriorated. Further, the cost also increases. In this configuration, a cross section of the straight portion of the conductor is shaped and then is inserted and placed in the slot. Here, it is necessary to shape a cross section of not only a portion to be stored in the slot but also the entire range of the conductor including the straight portion. Otherwise, the above-described insertion placement configuration cannot be realized. Therefore, it is necessary to perform shaping also for a portion that is essentially unnecessary, so an unnecessary process arises and assembly performance is deteriorated.

In shaping of a cross section of the straight portion, it is necessary to shape each conductor individually. Therefore, assembly performance of the stator is deteriorated. In this configuration, it is necessary to insert and place conductors having a plurality of sectional shapes in the same slot. Therefore, the sectional shapes of the conductors are required to be accurate. However, in this configuration, since it is necessary to shape each conductor individually and variation error in the shaping cannot be absorbed, reliability of the stator is deteriorated. Further, since a gap between the straight portion and the slot increases, a space factor reduces and efficiency of the rotary electric machine is deteriorated.

The present invention has been made to solve the above problems, and an object of the present invention is to obtain a stator of a rotary electric machine having high efficiency, high output, and excellent assembly performance, and a manufacturing method therefor.

Means for Solving the Problems

A rotary electric machine according to the present invention includes a rotor, and a stator placed on an outer circumference side of the rotor. The stator includes a stator core and stator coils. The stator core includes an inner ring core composed of a plurality of teeth extending in a radial direction and arranged so as to be spaced from each other in a circumferential direction, and a connection portion connecting inner circumferential portions of the plurality of teeth, and an outer ring core formed in a cylindrical shape and to be joined to outer circumferential surfaces of the plurality of teeth. Slots formed between the adjacent teeth of the stator core each have a circumferential direction width on an inner circumference side of the slots smaller than a circumferential direction width on an outer circumference side of the slots so that a circumferential direction width of the teeth is substantially constant along the radial direction. The stator coils are composed of a plurality of connected conductive coils obtained by shaping a conductive wire, the conductive coils including a plurality of slot accommodated portions placed in the slots, and a plurality of coil end portions connecting the plurality of slot accommodated portions outside the slots.

A manufacturing method for a rotary electric machine according to the present invention includes an insertion placement step of inserting the slot accommodated portions between the teeth from an outer side in the radial direction of the inner ring core, thereby placing the plurality of conductive coils in the slots of the inner ring core; a core coupling step of joining and attaching the outer ring core to an outer circumferential surface of the inner ring core in which the conductive coils are inserted and placed; and a joining step of joining terminal portions of the conductive coils to form the stator coil.

Effect of the Invention

In the present invention, as described above, slots have a circumferential direction width on the inner circumference side thereof smaller than a circumferential direction width on the outer circumference side thereof so that a circumferential direction width of teeth is substantially constant along the radial direction. Therefore, a difference in magnetic resistance in the radial direction of the teeth reduces, and it becomes possible to insert and place slot accommodated portions of conductive coils in the slots from an outer side in the radial direction of an inner ring core. Therefore, various negative effects due to the insertion placement from the axial direction can be avoided, and high efficiency and high output of a rotary electric machine and improvement in assembly performance thereof are realized.

EMBODIMENTS FOR CARRYING OUT THE INVENTION

Embodiment 1

Figure 1:
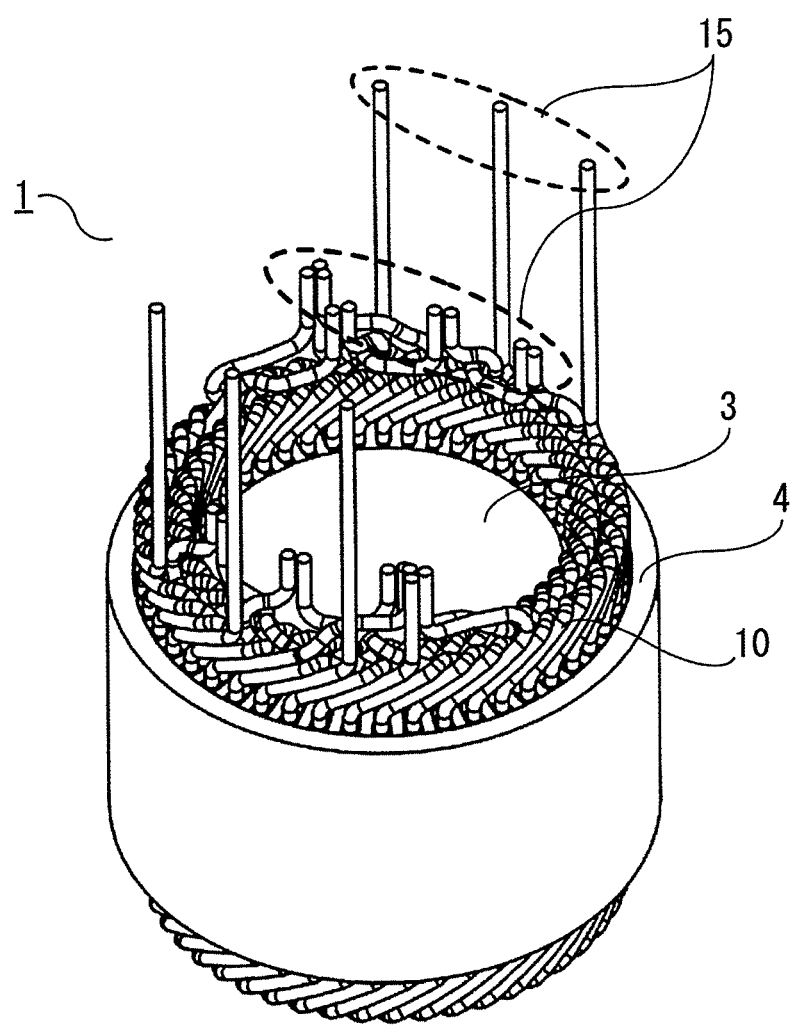
FIG. 1 is a perspective view showing a stator 1 of a rotary electric machine according to embodiment 1 of the present invention.
Figure 2:
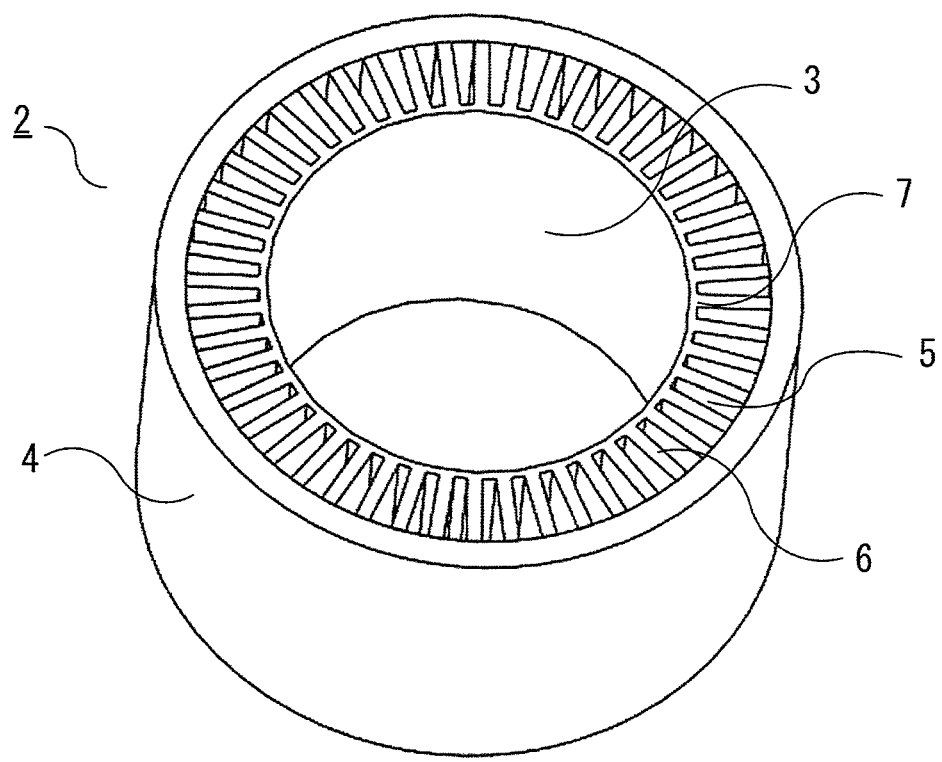
FIG. 2 is a perspective view showing a stator core 2 according to embodiment 1 of the present invention.
Figure 3:
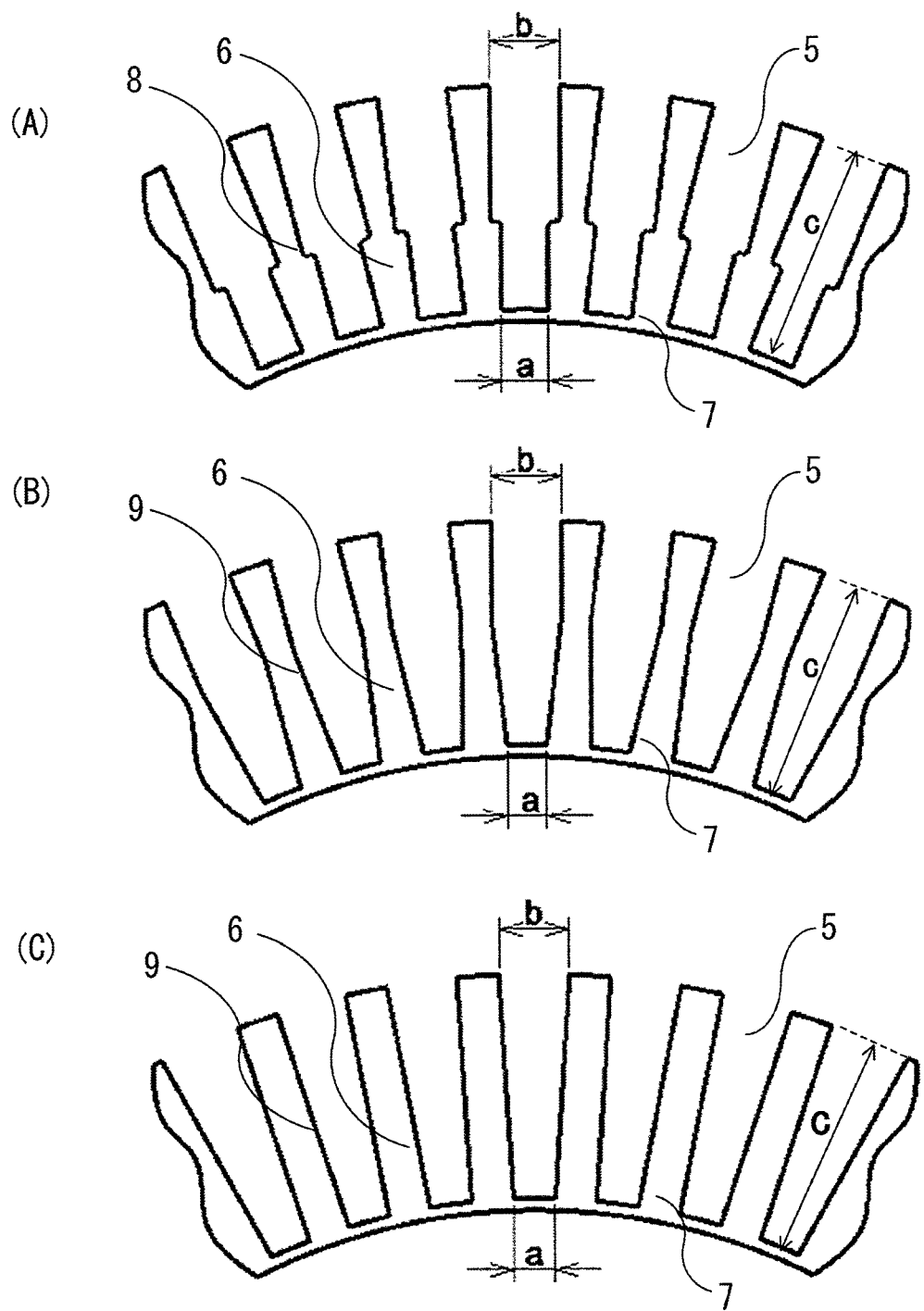
FIG. 3 is a major part sectional view of the stator core 2 according to embodiment 1 of the present invention.
Figure 4:
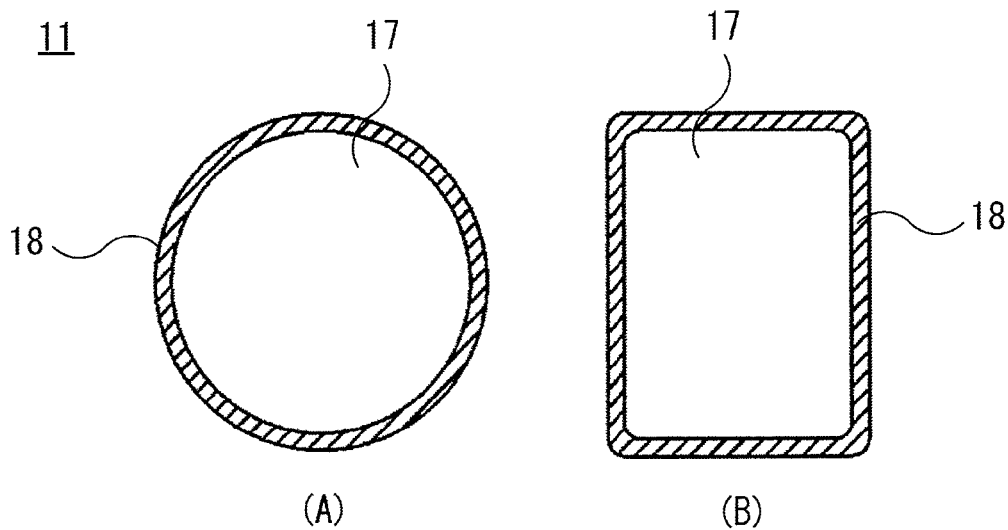
FIG. 4 is a sectional view of a conductive coil 11 according to embodiment 1 of the present invention.
Figure 5:
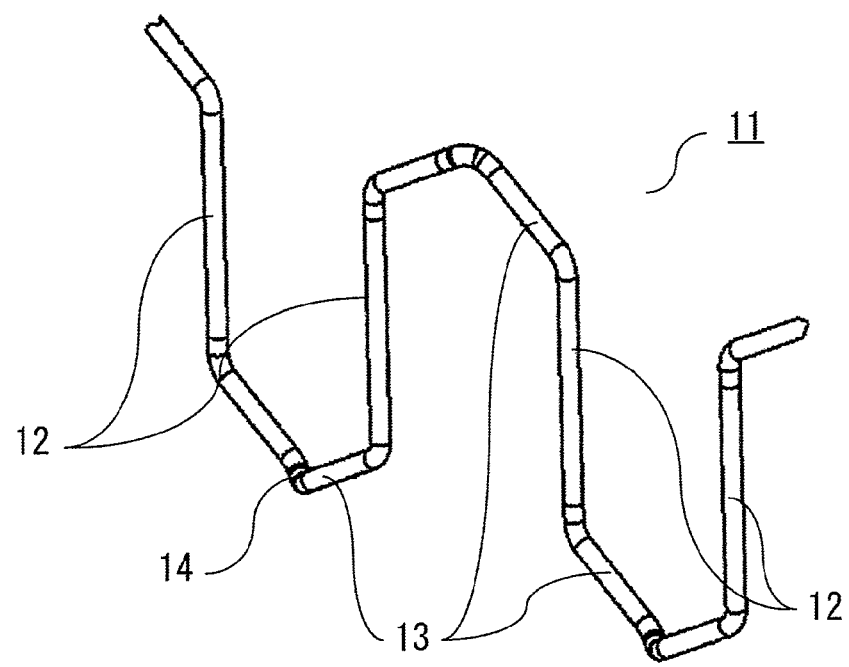
FIG. 5 is a major part perspective view of the conductive coil 11 according to embodiment 1 of the present invention.
Figure 6:
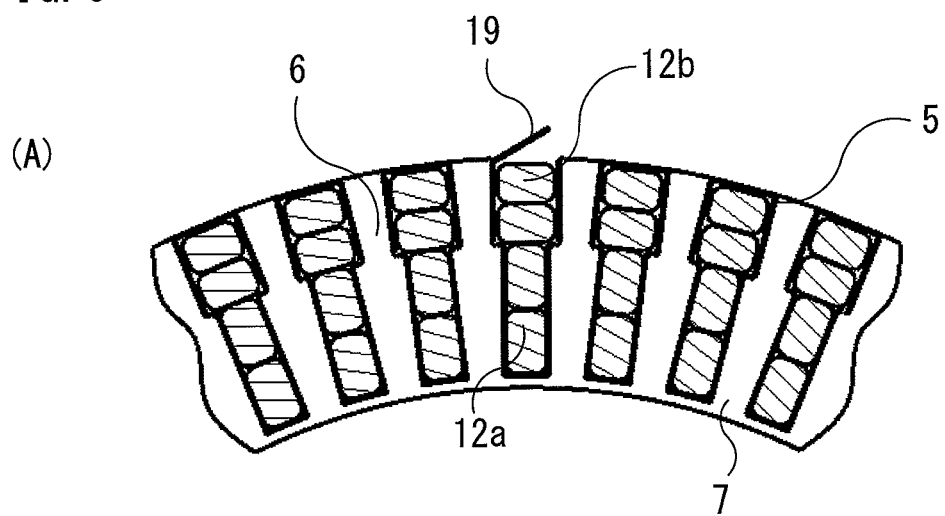
FIG. 6 is a major part sectional view of the conductive coil 11 according to embodiment 1 of the present invention.
Figure 6:
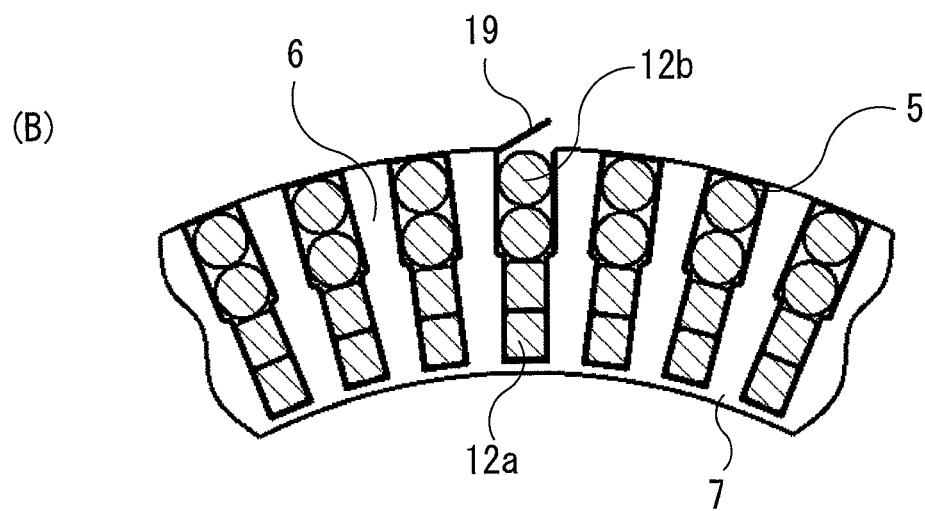
Figure 7:
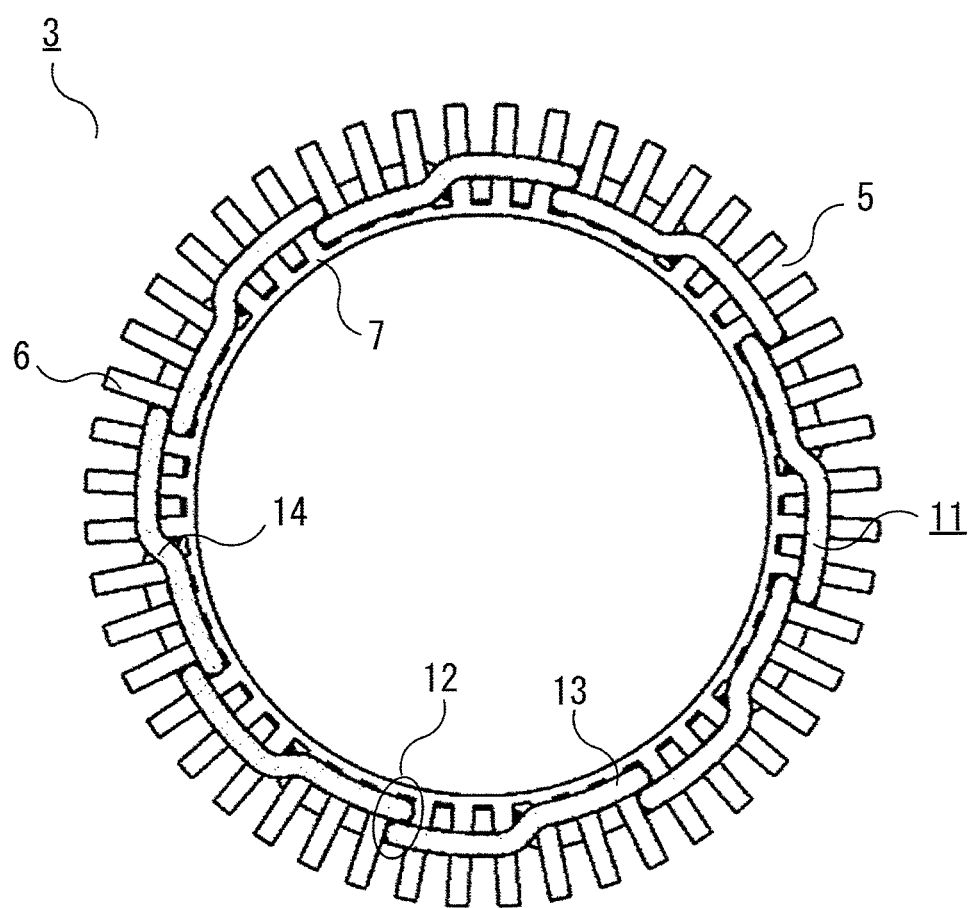
FIG. 7 is a major part top view of the stator 1 according to embodiment 1 of the present invention.

The structure of a stator of a rotary electric machine according to embodiment 1 of the present invention will be described with reference to FIG. 1 showing a stator 1, FIG. 2 showing a stator core 2, FIG. 3 showing a major part cross section of the stator core 2, FIG. 4 showing a cross section of a conductive coil 11, FIG. 5 showing a major part of the conductive coil 11, FIG. 6 showing a major part cross section of the conductive coil 11, and FIG. 7 showing a major part top view of the stator 1.

Although not shown, a rotor is located at the center of the rotary electric machine, and the stator 1 is located on the outer circumference side of the rotor.

As shown in FIG. 1 and FIG. 2, the stator 1 includes the stator core 2 formed in a ring shape and having a plurality of slots 5 arranged in the circumferential direction, and includes two sets of stator coils 10 in a three-phase (U phase, V phase, W phase) Y-connection form, which are wound on the stator core 2 in a distributed winding manner while being inserted through the slots 5.

As shown in FIG. 2, the stator core 2 includes an inner ring core 3 composed of a plurality of teeth 6 arranged substantially at predetermined regular intervals in the circumferential direction, and a connection portion 7 connecting inner circumferential portions of the teeth 6, and includes an outer ring core 4 forming a core back of the stator 1 and having a cylindrical shape. The inner ring core 3 and the outer ring core 4 are separate components. The outer ring core 4 is attached to an outer circumferential surface of the inner ring core 3, whereby the slots 5 are formed so as to be surrounded by the connection portion 7, the adjacent teeth 6, and the outer ring core 4.

Each slot 5 is formed so as to satisfy a<b<c, where a is a circumferential direction width on an inner circumference side of the slot 5, b is a circumferential direction width on an outer circumference side of the slot 5, and c is a radial direction length of the slot 5. Specific shapes of the slots 5 will be described with reference to FIG. 3(A) to FIG. 3(C).

In the slot 5 in FIG. 3(A), a step 8 is provided in the middle, so that the circumferential direction width a on the inner circumference side of the slot 5 is narrower than the circumferential direction width b on the outer circumference side of the slots 5. In the slot 5 in FIG. 3(B), a taper 9 is formed from the middle of the slot 5 so as to gradually narrow the circumferential direction width toward the inner circumference side from the outer circumference side, so that the circumferential direction width a on the inner circumference side of the slot 5 is narrower than the circumferential direction width b on the outer circumference side of the slots 5. In the slot 5 in FIG. 3(C), a taper 9 is provided in the entire side surfaces of the slot 5.

In the present embodiment 1, the number of the slots 5 and the number of the teeth 6 are each 48.

As shown in FIG. 1, the stator coil 10 is formed by connecting, by welding, coil terminal portions 15 of the plurality of conductive coils 11 inserted into the slots 5. As shown in FIGS. 4 and 5, the conductive coil 11 is formed by shaping one conductive wire composed of a conductive portion 17 and an insulating coat 18 formed by enamel baked on a surface of the conductive portion 17 so as to coat the conductive portion 17, and is composed of three or more slot accommodated portions 12 to be inserted and placed in the slots 5, and a plurality of coil end portions 13 connecting the slot accommodated portions 12.

The slot accommodated portions 12 are placed such that the plurality of slot accommodated portions 12 are arranged in the radial direction in each slot 5. In this case, since the circumferential direction width a on the inner circumference side of the slot 5 is narrower than the circumferential direction width b on the outer circumference side of the slot 5, the slot accommodated portions 12 having at least two kinds of sectional shapes are contained in the same slot. As shown in FIG. 6, the circumferential direction width of the slot accommodated portion 12a placed on the inner circumference side of the slot 5 is made smaller than the circumferential direction width of the slot accommodated portion 12b placed on the outer circumference side of the slots 5, whereby a gap between the slot 5 and the slot accommodated portion 12 is narrowed and a space factor of the stator 1 can be enhanced.

Specific sectional shapes and arrangement of the slot accommodated portions 12 will be described with reference to FIG. 6(A) and FIG. 6(B). In FIG. 6(A), the conductive coils 11 having a rectangular sectional shape are inserted and placed in different directions in the slots 5. On the inner circumference side of the slot 5, two slot accommodated portions 12a are placed which are first conductive coils formed in such a direction that the sectional shape thereof satisfies circumferential direction width≤radial direction width. On the outer circumference side of the slot 5, two slot accommodated portions 12b are placed which are second conductive coils formed in such a direction that the sectional shape thereof satisfies circumferential direction width≥radial direction width, and located on the outer circumference side relative to the first conductive coils.

In FIG. 6(B), the conductive coil 11 having a rectangular sectional shape and the conductive coil 11 having a circular sectional shape are inserted and placed in the slots 5. On the inner circumference side of the slot 5, two slot accommodated portions 12a are placed which are first conductive coils whose sectional shapes are rectangular. On the outer circumference side of the slot 5, two slot accommodated portions 12b are placed which are second conductive coils whose sectional shapes are circular.

Alternatively, on the inner circumference side of the slot 5, slot accommodated portions 12a which are first conductive coils having a circular sectional shape may be placed, and on the outer circumference side of the slot 5, slot accommodated portions 12b which are second conductive coils having a rectangular sectional shape may be placed. Still alternatively, for example, slot accommodated portions 12a and 12b having respective circular sectional shapes different in their diameters may be placed.

As shown in FIG. 7, two slot accommodated portions 12 connected via one coil end portion 13 are respectively placed in different slots 5, and the positions in the radial direction of the two slot accommodated portions 12 in the slots 5 are different from each other. Therefore, the coil end portion 13 has a lane change portion 14 for absorbing the difference in the positions in the radial direction, and the lane change portion 14 has substantially an arc shape. The lane change portion 14 is formed in advance at a stage where the conductive coil 11 is manufactured.

As shown in the drawings, in the present embodiment 1, the number of the slot accommodated portions 12 arranged in the radial direction in the same slot 5 is four, and the number of kinds of their sectional shapes is two.

Next, an assembly method of the stator 1 in the present embodiment 1 will be described with reference to FIGS. 8 and 9.

First, the slot accommodated portions 12 are inserted into each gap between the teeth 6 of the inner ring core 3, from an outer side in the radial direction of the inner ring core 3 (insertion placement step). As a method of the insertion, a method may be used in which a necessary number of conductive coils 11 are formed in advance substantially in a cylindrical shape on a jig having a diameter slightly greater than that of the inner ring core 3, and then are collectively inserted radially inward as shown in FIG. 8. In this case, slight deformation of the conductive coils 11 due to compression in the radial direction is absorbed outward of both ends in the axial direction of the stator core 2.

Figure 9:
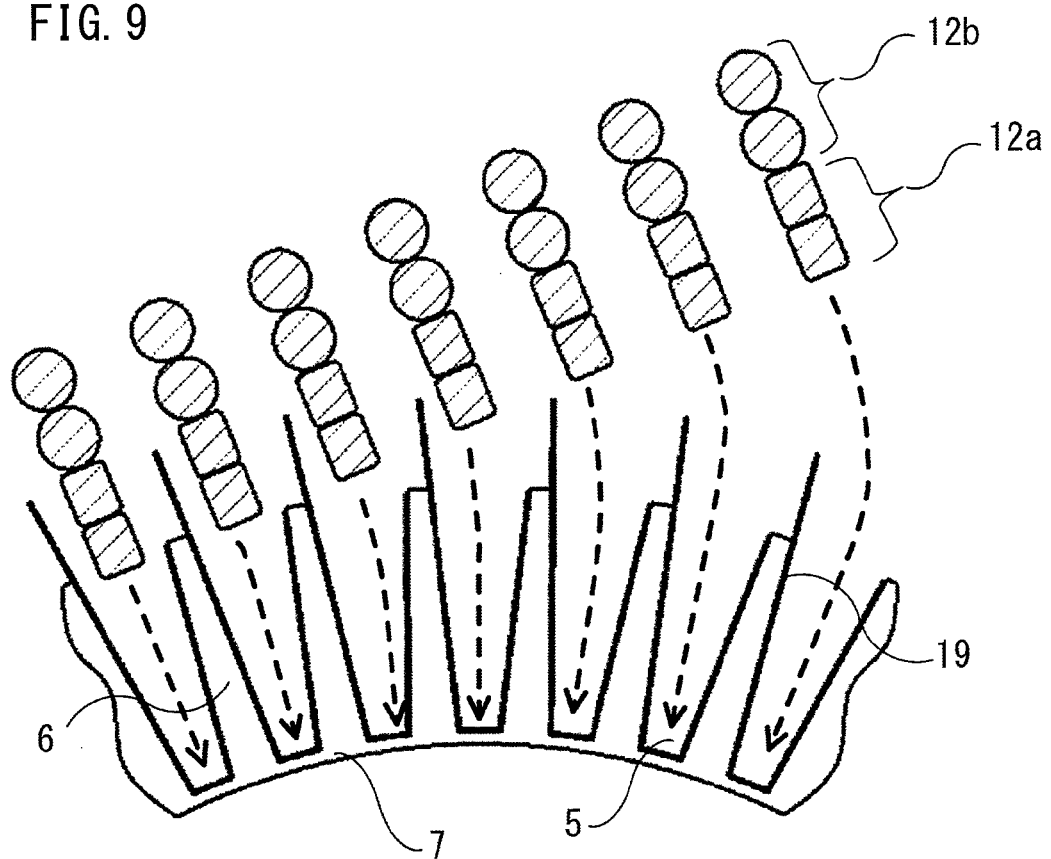
FIG. 9 is a major part sectional view for explaining an assembly method of the stator 1 according to embodiment 1 of the present invention.

As another method, as shown in FIG. 9, the conductive coils 11 may be arranged in a straight line once, and then may be directly inserted, sequentially from an end thereof, into the slots 5 of the inner ring core 3, as if wound up.

Figure 8:
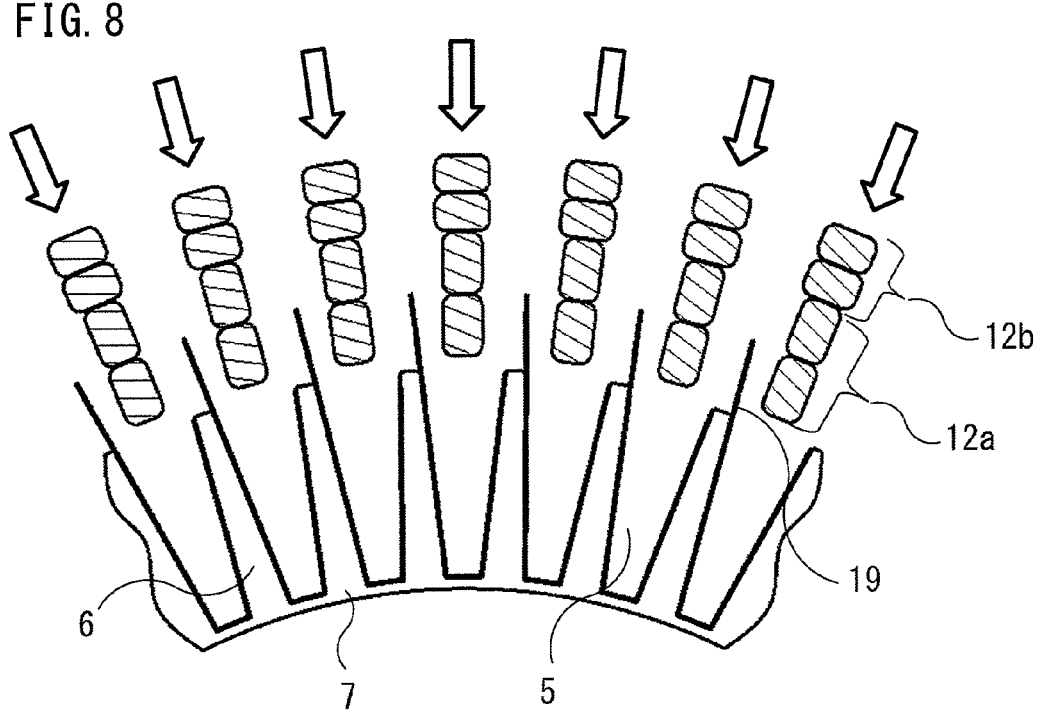
FIG. 8 is a major part sectional view for explaining an assembly method of the stator 1 according to embodiment 1 of the present invention.

Before the slot accommodated portions 12 are inserted, as shown in FIGS. 8 and 9, insulating sheets 19 are inserted and placed so as to cover the peripheries of the teeth 6 and the connection portion 7, thereby ensuring insulation between the slot accommodated portion 12 and the inner ring core 3.

Next, as a core coupling step, the outer ring core 4 is joined and attached to the outer circumferential surface of the inner ring core 3 in which the conductive coils 11 are inserted and placed.

Thereafter, the coil terminal portions 15 of the conductive coils 11 are joined with each other by, for example, TIG welding or resistance welding (joining step). The joint portion is formed by gathering two coil terminal portions 15 at one location and joining them. At a neutral point, since three points of U, V, and W need to be connected, three coil terminal portions 15 are gathered at one location and joined. As for a coil terminal portion 15 to be connected to another device such as a power supply or an inverter, an intermediate component (a terminal or the like) for connecting to other devices may be additionally joined, or nothing may be performed at this stage, to proceed to the next step.

In the present embodiment 1, a method in which the joining of the coil terminal portions 15 is performed after shaping and position adjustment has been described. However, for example, the joining may be performed via a relay component made by inserting or outserting a terminal to a resin. In this case, it is unnecessary to perform position adjustment work for the coil terminal portions 15, and therefore the assembly process is simplified and assembly performance is improved.

Although not shown here, if the number of poles of the rotor is eight, the number of slots for each pole for each phase of the stator 1 becomes two (=48÷(8×3)). Thus, the rotary electric machine can be driven with a double system. If, by the double system driving, phases for each phase are shifted from each other to heighten the orders of harmonics, ripple current can be decreased.

In addition, two inverters (not shown) for drive-controlling the rotary electric machine are used, and two independent drive circuits can be provided, whereby redundancy can be obtained.

As described above, in embodiment 1 of the present invention, the slot 5 is formed such that the circumferential direction width a on the inner circumference side thereof is smaller than the circumferential direction width b on the outer circumference side thereof. Therefore, the circumferential direction width of each tooth 6 can be made substantially constant along the radial direction, whereby a difference in magnetic resistance in the radial direction of the tooth 6 is reduced and performance of the rotary electric machine is improved.

The conductive coil 11 includes the first conductive coil which forms the slot accommodated portion 12 placed on the inner circumference side of the slot 5, and the second conductive coil which forms the slot accommodated portion 12 placed on the outer circumference side of the slot 5. As the first and second conductive coils, conductive wires having sectional shapes that are different from each other and matched to the shape of the slot 5 are used respectively. Therefore, a space factor of the slot accommodated portion 12 in the slot 5 can be increased, and resistance of the stator coil 10 can be reduced, whereby efficiency and output of the rotary electric machine are improved.

In this case, for each conductive coil 11, it is not necessary to shape a sectional shape of a part of the conductor so as to be matched to the shape of the slot 5. Therefore, workability in forming the conductive coil 11 is improved.

Further, in this case, the circumferential width of a cross section of the coil end portion 13 of the first conductive coil placed on the inner circumference side of the slot 5 is also smaller than that of the coil end portion 13 of the second conductive coil placed on the outer circumference side of the slot 5. Naturally, an area that can be occupied by the coil end portion 13 is narrower on the inner circumference side than on the outer circumference side.

Therefore, it is possible to form the coil end portions 13 of both the first conductive coil and the second conductive coil without difficulty, and as a result, resistance of the stator coil 10 can be reduced, and efficiency and output of the rotary electric machine are improved.

In the present embodiment 1, the slot accommodated portion 12 of the conductive coil 11 is inserted and placed in the slot 5 from the outer side in the radial direction of the inner ring core 3, and the circumferential direction width a on the inner circumference side of the slot 5 is greater than the circumferential direction width b on the outer circumference side of the slot 5. Therefore, an insertion port on the outer circumference side for inserting the slot accommodated portion 12 is wide. Therefore, work for inserting the conductive coil 11 into the inner ring core 3 is facilitated, and assembly performance of the stator 1 is improved.

Since the inner circumferential portions of the inner ring core 3 are connected by the connection portion 7, rigidity of the stator core 2 can be increased. Therefore, in insertion of the conductive coil 11 and attachment of the outer ring core 4 to the inner ring core 3, deformation of the core can be prevented. Thus, assembly performance of the stator 1 is improved.

In addition, the increase in rigidity of the stator core 2 can suppress vibration and noise of the rotary electric machine, whereby performance, quality, and reliability of the rotary electric machine are improved.

Since the lane change portion 14 is formed on the coil end portion 13 in advance, when the conductive coil 11 is inserted into a gap between the teeth 6, interference between the conductive coils 11 can be prevented, and thus assembly performance of the stator 1 is improved. Further, trouble such as damage of the insulating coat 18 due to contact between the conductive coils 11 can be suppressed, and thus quality of the rotary electric machine is improved.

As described above, since the number of slots for each pole for each phase of the stator 1 is two, it is possible to perform driving with a double system, thereby it is possible to reduce ripple current. Thus, cogging torque of the rotary electric machine can be reduced, and the quality thereof is also stabilized. In addition, by providing two inverters as a drive power supply, the rotary electric machine can have redundancy. Thus, reliability of the rotary electric machine is improved.

In addition, by providing drive circuits in parallel, current flowing in each circuit can be reduced. Thus, in such a case where, particularly, in a small-capacity machine, conductors having the same size that is a lower limit size are used in order to withstand mechanical stress in winding work or the like, loss in the rotary electric machine is reduced, and performance and reliability of the rotary electric machine are improved.

In the above description, the case where the stator 1 has a double-three-phase configuration including two sets of three-phase Y-connected coils has been shown. However, the stator 1 is not limited thereto, and the present invention is similarly applicable to a configuration having a single phase or phases more than three, and an equivalent effect can be obtained. In addition, the connection manner may be Δ connection. Although the case where the number of slots of the stator 1 is 48 has been shown, the number of slots is not limited thereto. Although the case where the number of the slot accommodated portions 12 placed in the same slot 5 is four and the number of kinds of sectional shapes of the slot accommodated portions 12 inserted in the same slot 5 is two has been shown, these numbers are not limited thereto.

Embodiment 2

Figure 10:
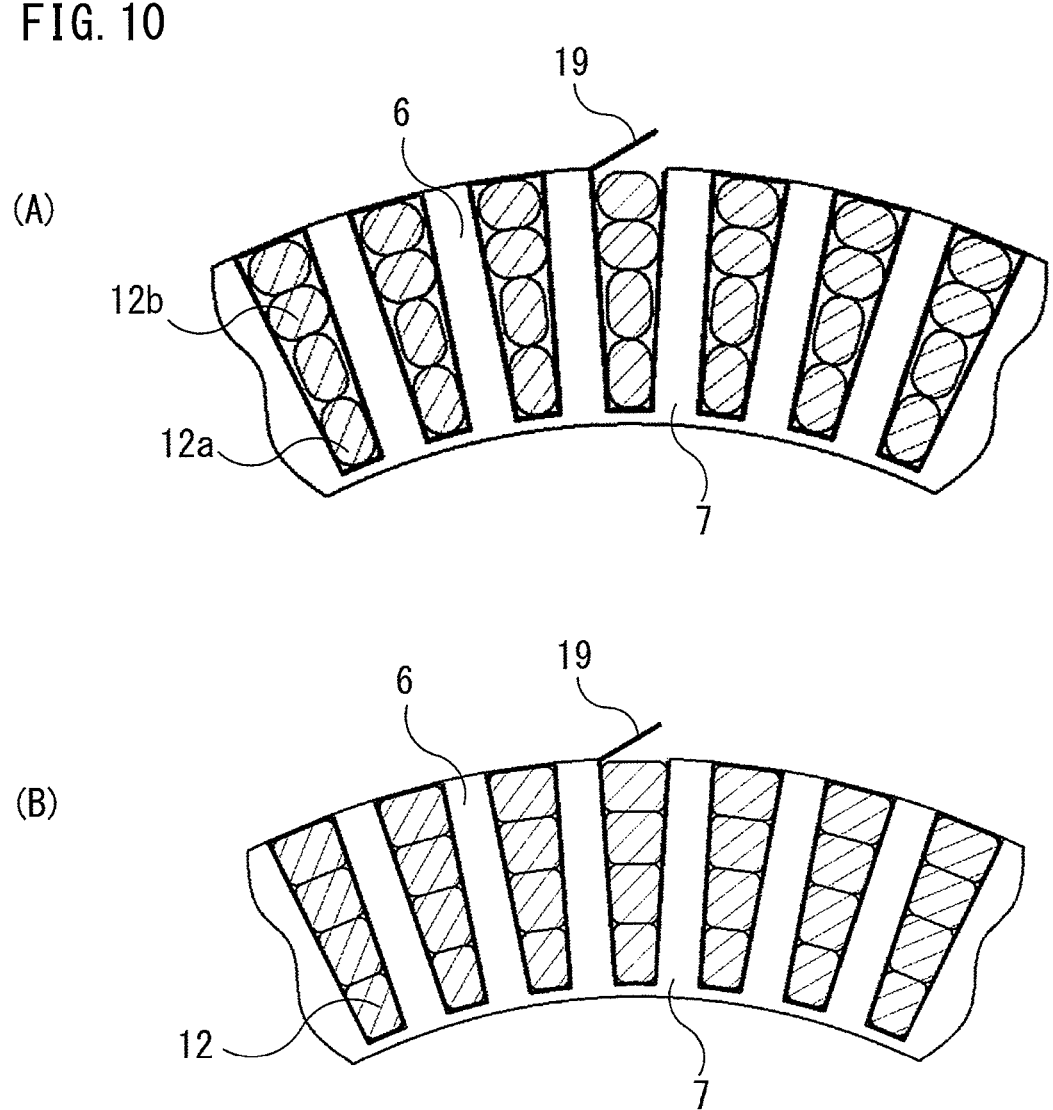
FIG. 10 is a major part sectional view of a conductive coil 11 according to embodiment 2 of the present invention.
Figure 11:
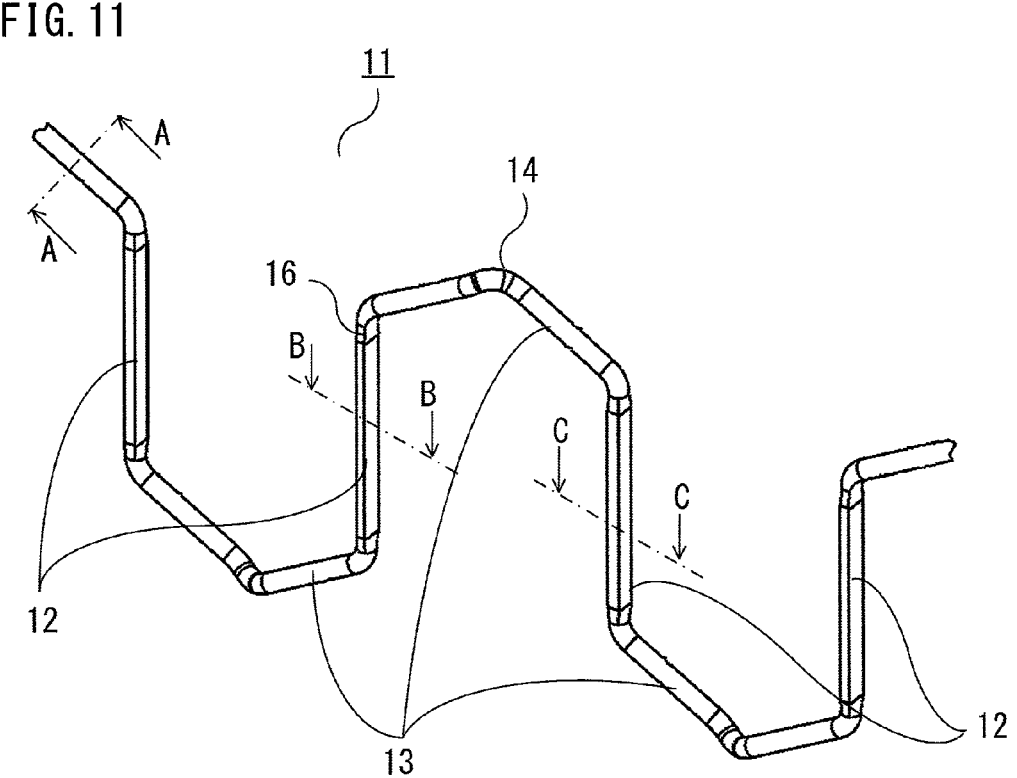
FIG. 11 is a major part perspective view of the conductive coil 11 according to embodiment 2 of the present invention.

The structure of a stator of a rotary electric machine according to embodiment 2 of the present invention will be described with reference to FIG. 10 showing a major part cross section of a conductive coil 11 and FIG. 11 showing a major part of the conductive coil 11. Components that are substantially the same as in the above embodiment 1 are denoted by the same reference characters, and the description thereof is omitted.

Embodiment 2 is different from embodiment 1 in that the slot accommodated portion 12 of the conductive coil 11 is shaped to have a sectional shape different from that of the original conductive wire. Hereinafter, this point will be mainly described.

Specific sectional shapes of the slot accommodated portion 12 will be described with reference to FIG. 10(A) and FIG. 10(B). In FIG. 10(A), the slot accommodated portion 12 of the conductive coil 11 having a circular sectional shape is shaped to have two sides. On the inner circumference side of the slot 5, two slot accommodated portions 12a are placed in such a direction that the sectional shape thereof satisfies circumferential direction width≤radial direction width. On the outer circumference side of the slot 5, two slot accommodated portions 12b are placed in such a direction that the sectional shape thereof satisfies circumferential direction width≥radial direction width.

In FIG. 10(B), the slot accommodated portion 12 of the conductive coil 11 having a circular sectional shape is shaped to have four sides. As described later, with use of an upper mold 20 and a lower mold 21 matched to the shape of the slot 5, the slot accommodated portion 12 is shaped so that both circumferential direction ends thereof have a shape along the circumferential direction width shape of the slot 5, and both radial direction ends thereof have a shape along a direction perpendicular to the radial direction.

Figure 12:
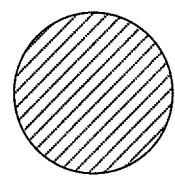
FIG. 12 is a sectional view taken along A-A line in FIG. 11.
Figure 13:
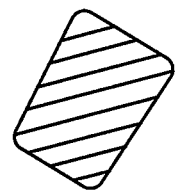
FIG. 13 is a sectional view taken along B-B line in FIG. 11.
Figure 14:
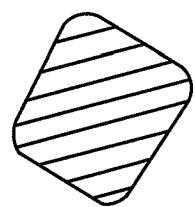
FIG. 14 is a sectional view taken along C-C line in FIG. 11.

FIG. 11 shows an external view of the conductive coil 11 of the present embodiment 2. The slot accommodated portion 12 is shaped so that the sectional shape thereof becomes substantially trapezoidal. FIG. 12 is a sectional view taken along A-A line in FIG. 11. FIG. 13 is a sectional view taken along B-B line in FIG. 11. FIG. 14 is a sectional view taken along C-C line in FIG. 11.

Figure 15:
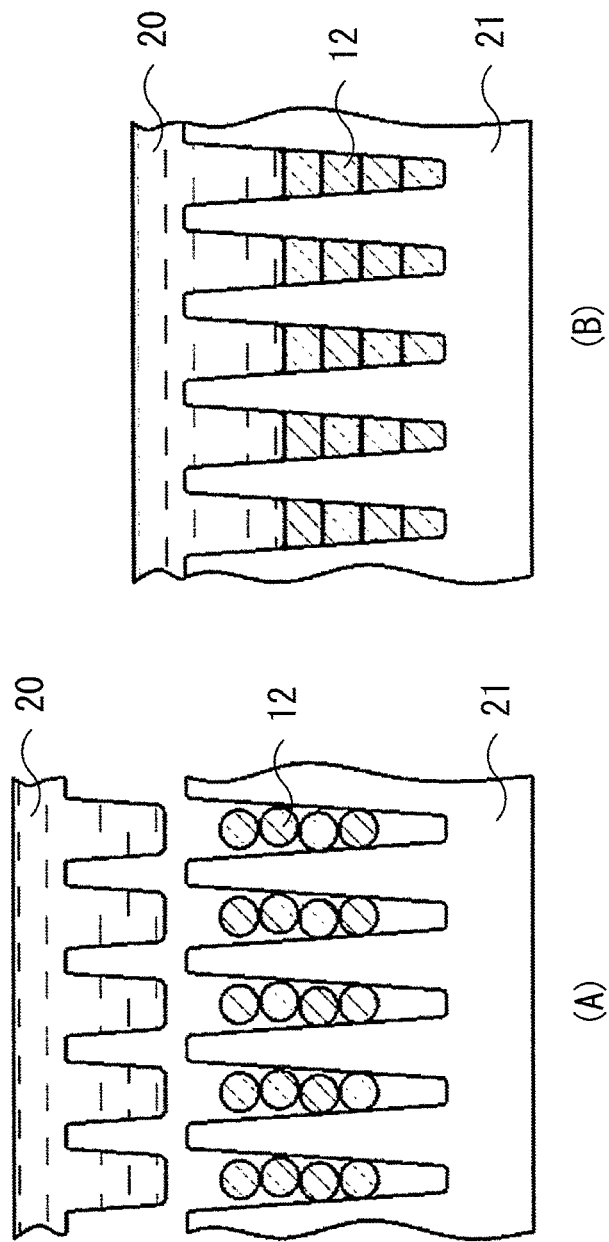
FIG. 15 is a major part sectional view for explaining a method for shaping the conductive coil 11 according to embodiment 2 of the present invention.
Figure 16:
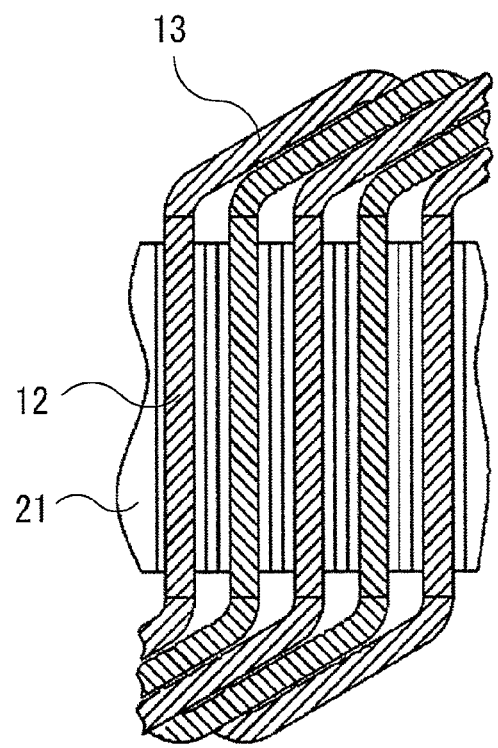
FIG. 16 is a major part top view showing the conductive coil 11 set in a mold, according to embodiment 2 of the present invention.

Next, a method for shaping the slot accommodated portion 12 in the present embodiment 2 will be described with reference to FIG. 15 to FIG. 17. First, portions of the conductive coils 11, corresponding to the slot accommodated portions 12, are set in the lower mold 21 (FIG. 15(A)). Then, the upper mold 20 is set to the lower mold 21, to perform pressure forming (FIG. 15(B)). At this time, in order to shape only the slot accommodated portions 12, as shown in FIG. 13, the coil end portions 13 are placed outside the molds 20 and 21.

Figure 17:
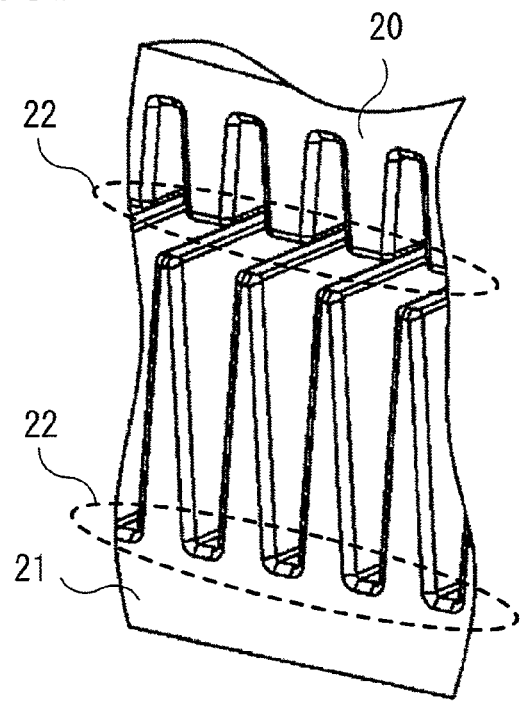
FIG. 17 is a major part perspective view showing the mold for shaping the conductive coil 11 according to embodiment 2 of the present invention.

As shown in FIG. 17, release portions 22 having a taper shape or an arc shape are provided at ends in the axial direction of the upper mold 20 and the lower mold 21. Thus, a relay portion 16 (FIG. 11) having an arc shape or a taper shape is formed at a boundary between the slot accommodated portion 12 to be shaped and the coil end portion 13 which is not to be shaped. Via the relay portion 16, the shaped part and the non-shaped part, i.e., the slot accommodated portion 12 and the coil end portion 13 are smoothly connected, whereby breakage of the insulating coat due to sharp change in the cross section is prevented.

Here, the sectional shape of the slot accommodated portion 12 that has been shaped will be described with reference to FIG. 10 and FIG. 18. A plurality of the slot accommodated portions 12 are set at the same time, and then collectively shaped. Thus, the degree of contact between the slot accommodated portions 12 increases, whereby escape from the molds 20 and 21 and positional deviation which can be caused by impact in the other manufacturing process can be suppressed. Further, since contact areas of the slot accommodated portions 12 also increase, an effect of heat dissipation of coils in the rotary electric machine is also improved.

Since the slot accommodated portion 12 is shaped substantially into a trapezoidal shape, in the shaping, the slot accommodated portion 12 receives reaction forces from four directions by the upper mold 20 and lower mold 21 or the adjacent slot accommodated portions 12. Thus, the cross section spreads toward four corners, to be shaped substantially into a trapezoidal shape. At this time, not only the conductive portion 17 of the conductive wire but also the insulating coat 18 spreads toward four corners, and as shown in FIG. 18, the thickness of the insulating coat at corners in the cross section becomes greater than at the other part.

Generally, an electric field concentrates on a corner portion and an edge portion, and these portions are likely to undergo insulation breakdown. Therefore, increasing the thickness of the insulating coat at corners in the cross section by shaping improves withstand voltage, thus an advantage in terms of dielectric strength is obtained.

Figure 18:
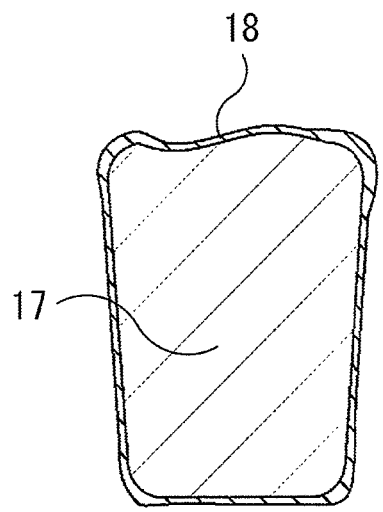
FIG. 18 is a major part sectional view of the conductive coil 11 after shaping, according to embodiment 2 of the present invention.

Although FIG. 18 shows the sectional shape of the slot accommodated portion 12 inserted and placed on the innermost circumference side of the slot 5 in FIG. 10, the cross sections of the other slot accommodated portions 12 are also shaped similarly.

As described above, in embodiment 2 of the present invention, since the slot accommodated portions 12 are pressure-formed into a shape along the slot shape by using the molds 20 and 21, a gap between the slot accommodated portions 12 and the slot 5 is narrowed, whereby a space factor of the slot accommodated portions 12 in the slot 5 increases, and therefore a space factor of the stator 1 increases. As a result, resistance of the stator coil 10 reduces, and efficiency and output of the rotary electric machine are improved.

On an extension of the slot accommodated portion 12, the coil end portion 13 is formed which keeps its original conductor shape without being shaped. Thus, the slot accommodated portion 12 that has been shaped is fitted in the slot 5 with no gap, and is securely held by the stator core 2. Therefore, after the stator coil 10 is inserted and placed in the inner ring core 3, displacement in the axial direction can be suppressed, whereby assembly performance of the stator 1 is improved.

In the shaping, since the release portions 22 are provided on the molds, the relay portion 16 is formed at the boundary between the shaped slot accommodated portion 12 and the coil end portion 13, whereby these portions are smoothly successive. Thus, stretch or breakage of the insulating coat 18 due to sharp change in the cross section can be prevented, whereby reliability of the rotary electric machine is improved.

By the shaping, the thickness of the insulating coat 18 at corners in the cross section becomes greater than at the other part. Therefore, the withstand voltage of the stator coil 10 is improved, and quality and reliability of the rotary electric machine are improved.

In shaping of the slot accommodated portions 12, a plurality of slot accommodated portions 12 are collectively shaped at the same time. Therefore, their cross sections can be shaped accurately, and can be made further close to the slot shape. Thus, a space factor of the stator 1 can be increased, resistance of the stator coil 10 is reduced, and efficiency and output of the rotary electric machine are improved.

By shaping collectively, it becomes possible to reduce a process, a facility, and a time for working. Therefore, the stator core 2 can be assembled with low cost, and assembly performance is also improved. In addition, the degree of contact between the slot accommodated portions 12 increases, and positional deviation can be suppressed. Therefore, assembly performance of the stator 1 is improved. Further, since contact areas of the slot accommodated portions 12 increase, heat dissipation performance of the stator coil 10 is improved, and performance, quality, and reliability of the rotary electric machine are improved.

The portions to be shaped are limited to the slot accommodated portions 12. Therefore, after the stator 1 is assembled, the shaped portions can be protected by the stator core 2. Thus, deterioration in the shaped portions due to disturbance can be prevented, and reliability of the rotary electric machine can be ensured.

In the above description, the case where the conductive coil 11 is obtained by shaping a conductive wire having a circular sectional shape has been shown. However, the conductive coil 11 is not limited thereto. For example, the present invention is similarly applicable to the case of using a conductive wire having a rectangular sectional shape, whereby an equivalent effect is obtained. In the shaping of the conductive coil 11, the number of the slot accommodated portions 12 shaped at the same time is four, but is not limited thereto.

Embodiment 3

Figure 19:
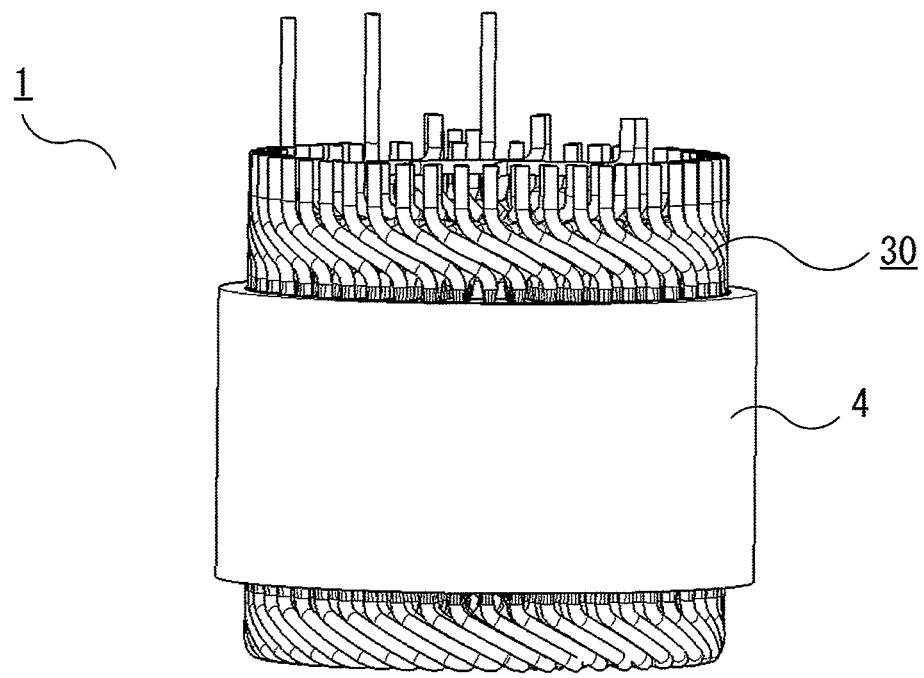
FIG. 19 is a perspective view showing a stator 1 according to embodiment 3 of the present invention.
Figure 20:
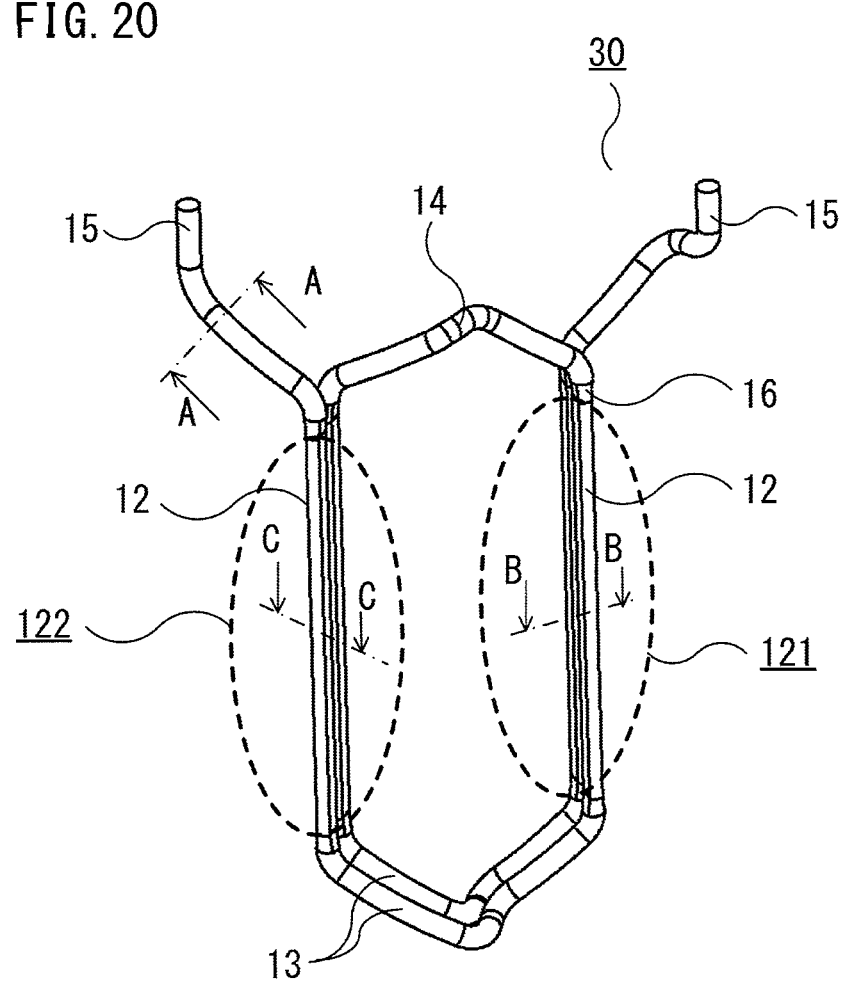
FIG. 20 is a perspective view showing a hexagonal coil 30 according to embodiment 3 of the present invention.

The structure of a stator of a rotary electric machine according to embodiment 3 of the present invention will be described with reference to FIG. 19 showing a stator 1 and FIG. 20 showing a hexagonal coil 30 which is a conductive coil. Components that are substantially the same as in the above embodiments 1 and 2 are denoted by the same reference characters, and the description thereof is omitted as appropriate.

Embodiment 3 is different from embodiments 1 and 2 in that the conductive coil of embodiment 3 is the hexagonal coil 30 obtained by shaping the conductive wire substantially into a hexagonal shape while winding the conductive wire by lap winding. Hereinafter, this point will be mainly described.

FIG. 19 shows the stator 1 formed by connecting, by welding, coil terminal portions 15 of the plurality of hexagonal coils 30 inserted in the slot 5.

Figure 21:
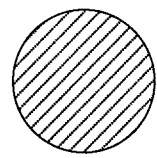
FIG. 21 is a sectional view taken along A-A line in FIG. 20.
Figure 22:
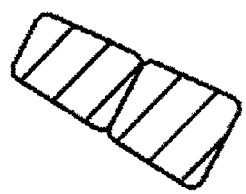
FIG. 22 is a sectional view taken along B-B line in FIG. 20.
Figure 23:
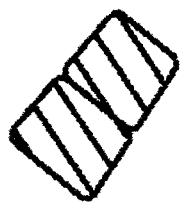
FIG. 23 is a sectional view taken along C-C line in FIG. 20.

Next, with reference to FIG. 20, the structure of the hexagonal coil 30 will be described. The hexagonal coil 30 is formed by shaping one conductive wire substantially into a hexagonal shape while winding the conductive wire by lap winding, the one conductive wire being composed of a conductive portion 17 and an insulating coat 18 coating a surface of the conductive portion 17. FIG. 21 is a sectional view taken along A-A line in FIG. 20. FIG. 22 is a sectional view taken along B-B line in FIG. 20. FIG. 23 is a sectional view taken along C-C line in FIG. 20.

The hexagonal coil 30 includes a first slot accommodated portion 121, and a second slot accommodated portion 122 placed in the slot 5 different from the slot 5 in which the first slot accommodated portion 121 is placed, the second slot accommodated portion 122 being placed on the outer circumference side relative to a radial direction position where the first slot accommodated portion 121 is placed. The first slot accommodated portion 121 and the second slot accommodated portion 122 are each composed of a plurality of (in the example in FIG. 20, two) conductive wires, and are connected to each other via a plurality of coil end portions 13.

Figure 24:
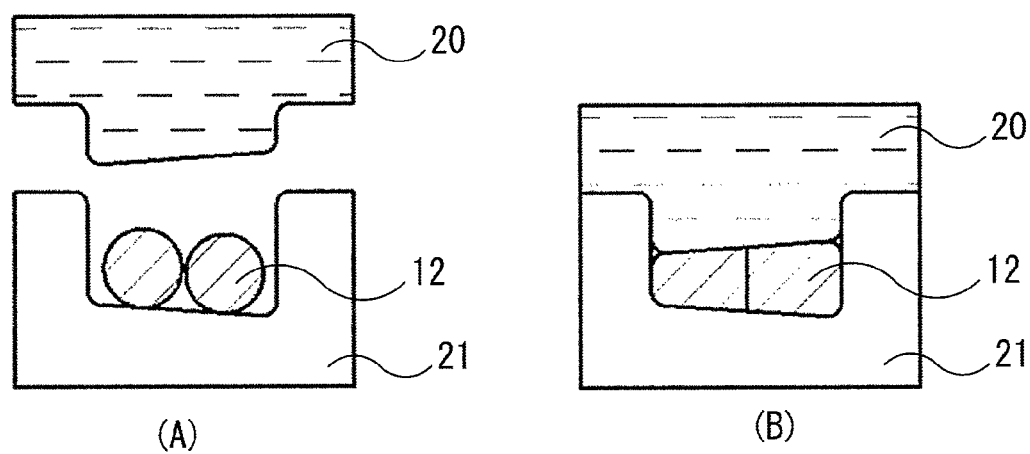
FIG. 24 is a major part sectional view for explaining a method for shaping the hexagonal coil 30 according to embodiment 3 of the present invention.

Next, a method for shaping the slot accommodated portions 121 and 122 will be described. In this shaping, as in the above embodiment 2, the plurality of slot accommodated portions 12 are set at the same time and collectively shaped. At this time, as shown in FIG. 24(A) and FIG. 24(B), the shaping may be performed with the slot accommodated portions 12 displaced from each other and arranged horizontally.

For either one of the slot accommodated portions 121 and 122, a conductive wire matched to the shape of an inner circumferential portion or an outer circumferential portion, of the slot 5, in which the one slot accommodated portion is to be inserted may be used, and the other one may be formed by shaping a cross section of the conductive wire so as to be matched to the shape of an inner circumferential portion or an outer circumferential portion, of the slot 5, in which the other one is to be inserted. Alternatively, both slot accommodated portions 121 and 122 may be formed by shaping a cross section of the conductive wire.

Next, a method for assembling the stator 1 of the present embodiment 3 will be described with reference to FIG. 25 and FIG. 26.

The first slot accommodated portion 121 is inserted into a gap between the teeth 6 of the inner ring core 3, from the outer side in the radial direction of the inner ring core 3. Then, the second slot accommodated portion 122 is inserted and placed in the slot 5 different from the slot 5 in which the first slot accommodated portion 121 is inserted and placed.

Figure 25:
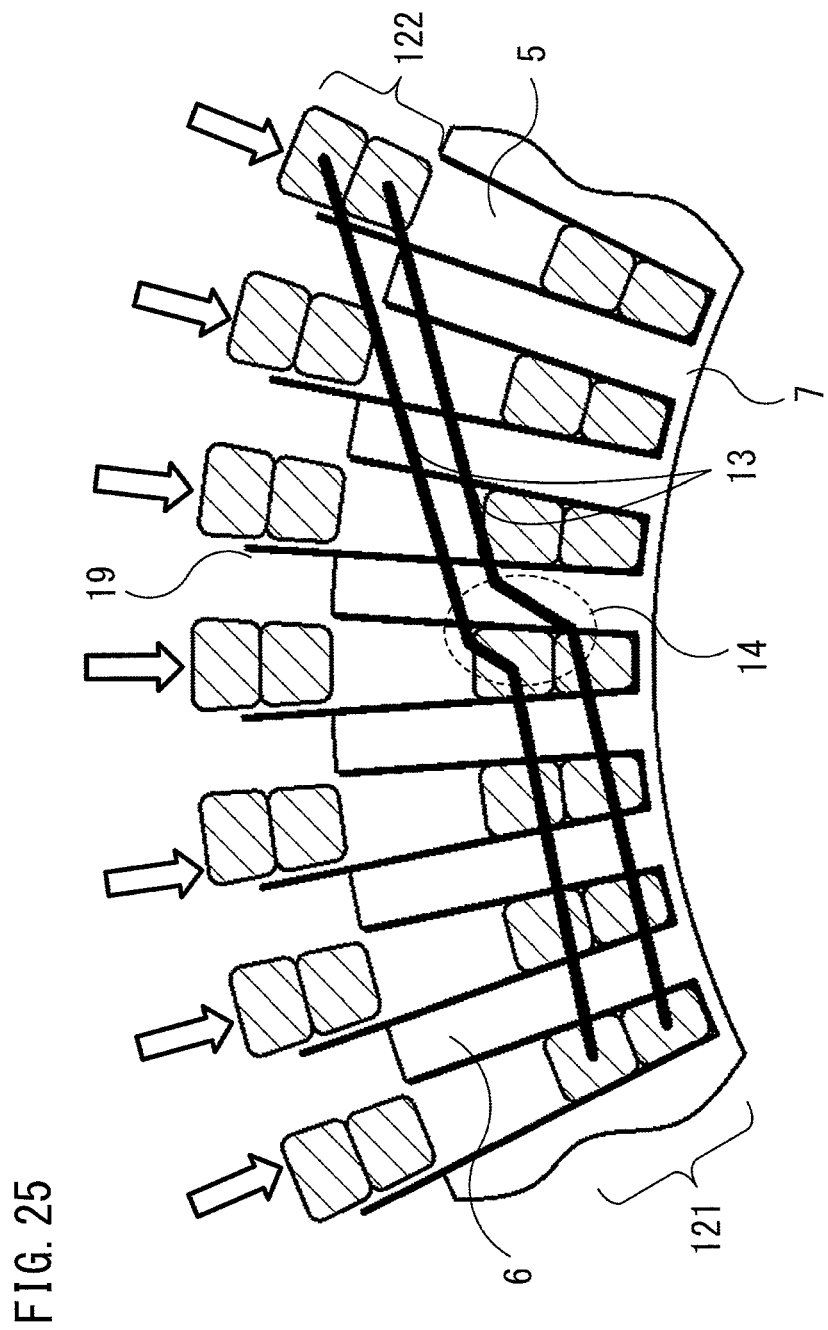
FIG. 25 is a major part sectional view for explaining an assembly method of the stator 1 according to embodiment 3 of the present invention.

As a method for the insertion, as shown in FIG. 25, the same number of the hexagonal coils 30 as the number of the slots 5 are arranged in a cylindrical shape such that the first slot accommodated portions 121 of the hexagonal coils 30 are located on the inner circumference side of the slots 5 and the second slot accommodated portions 122 of the hexagonal coils 30 are located on extensions in the radial direction of the slots 5. Then, the second slot accommodated portions 122 are inserted from the radial direction at one time.

Figure 26:
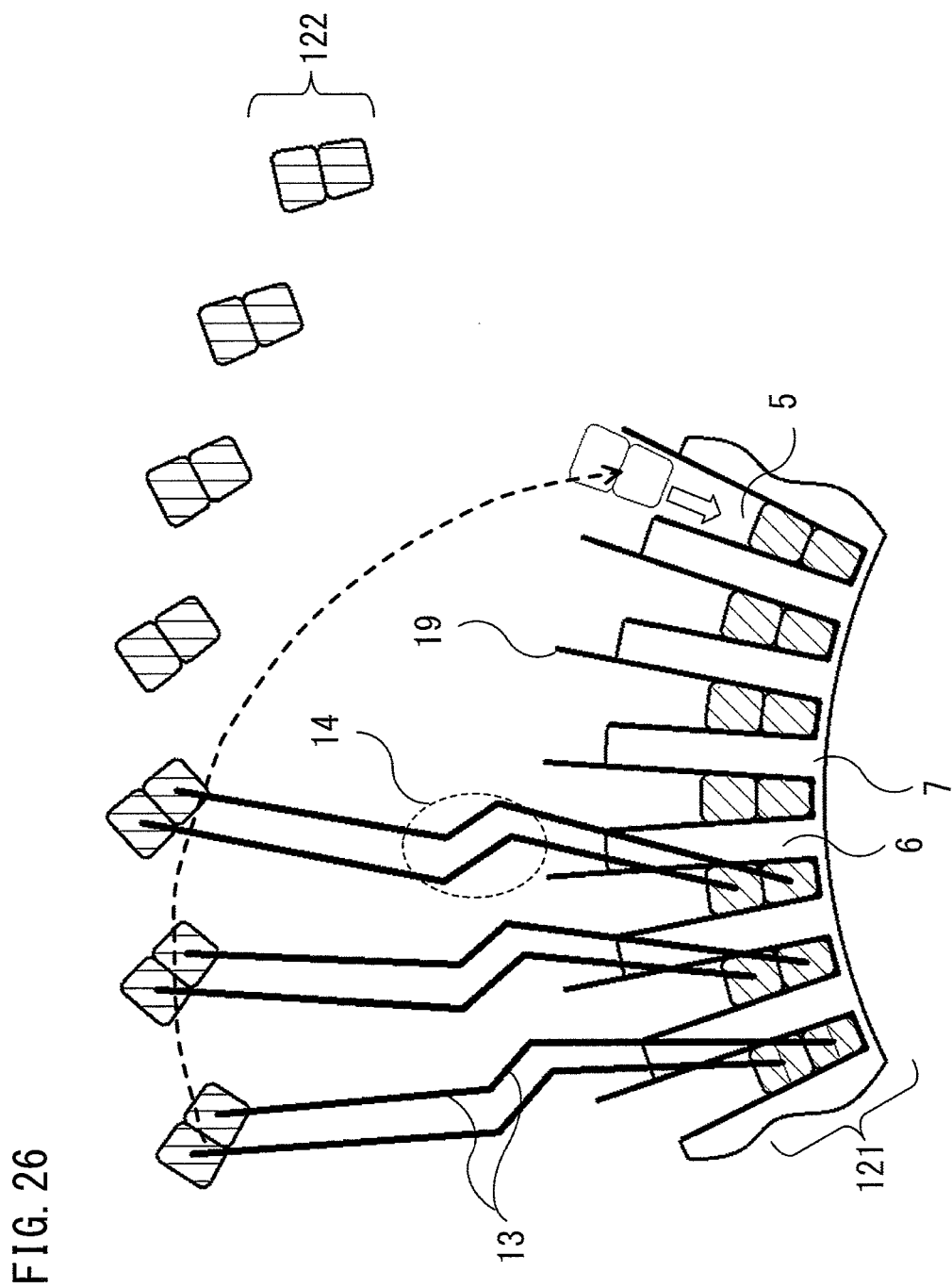
FIG. 26 is a major part sectional view for explaining an assembly method of the stator 1 according to embodiment 3 of the present invention.

Alternatively, as shown in FIG. 26, the first slot accommodated portions 121 of the hexagonal coils 30 are located on the inner circumference side of the slots 5 and the same number of the second slot accommodated portions 122 as the number of the slots 5 are radially arranged so as not to interfere with each other. Then, the second slot accommodated portions 122 may be inserted into the slots 5 while being moved rotationally about the first slot accommodated portions 121.

Before the slot accommodated portions 12 are inserted, insulating sheets 19 are inserted and placed so as to cover the peripheries of each tooth 6 and the connection portion 7, thereby insulation between the slot accommodated portion 12 and the inner ring core 3 is ensured.

As described above, in embodiment 3 of the present invention, since the hexagonal coil 30 obtained by shaping a conductive wire substantially into a hexagonal shape while winding the conductive wire by lap winding is used as the conductive coil, the coil shape is simplified.

That is, as is found by comparing FIG. 20 with the aforementioned FIG. 5 and FIG. 11, the conductive coil as a manufacturing unit is downsized, and a mold for shaping the coil is also downsized and has a simple structure.

Thus, it becomes possible to manufacture the stator 1 with low cost, and assembly performance is improved.

Further, the length of the slot accommodated portion 12 can be easily changed, and therefore the degree of freedom in designing can be increased.

The first slot accommodated portion 121 of the hexagonal coil 30 is inserted and placed on the inner circumference side of the inner ring core 3, and the second slot accommodated portion 122 of the hexagonal coil 30 is inserted and placed on the outer circumference side of the inner ring core 3. Therefore, the stator coil 10 can be formed by the hexagonal coils 30 having one kind of shape. Thus, since a common component can be used, it becomes possible to manufacture the stator 1 with low cost, and assembly performance is also improved.

In the above description, the first slot accommodated portion 121 and the second slot accommodated portion 122 of the hexagonal coil 30 are each composed of collection of two slot accommodated portions 12. However, in application of the present invention, the number of the slot accommodated portions 12 is not limited thereto, and different numbers of slot accommodated portions 12 may be used.

Although the second slot accommodated portion 122 is arranged outside the first slot accommodated portion 121, the arrangement is not limited thereto. For example, both first and second slot accommodated portions 121 and 122 may be placed on the inner circumference side of the slots 5, and another hexagonal coil 30 may be inserted and placed on the outer circumference side of the slots 5.

Although the case where the number of the slots 5 of the stator 1 is 48 has been shown, the number is not limited thereto. Although the case where the number of the slot accommodated portions 12 arranged in the radial direction is four has been shown, the number is not limited thereto. Although the case where the number of the inserted hexagonal coils 30 is the same as the number of the slots 5 has been shown, the number is not limited thereto, and for example, the hexagonal coils 30 whose number is n times as large as the number of the slots 5 may be inserted.

It is noted that, within the scope of the present invention, the above embodiments may be freely combined with each other, or each of the above embodiments may be modified or abbreviated as appropriate.

INDUSTRIAL APPLICABILITY

The rotary electric machines of embodiments 1 to 3 described above are used for, for example, a drive motor for electric power steering for vehicle. However, usage thereof is not limited thereto.

The invention claimed is:

1. A manufacturing method for a rotary electric machine including a rotor and a stator placed on an outer circumference side of the rotor, wherein
the stator includes a stator core and stator coils,
the stator core includes an inner ring core composed of a plurality of teeth extending in a radial direction and arranged so as to be spaced from each other in a circumferential direction, and a connection portion connecting inner circumferential portions of the plurality of teeth; and an outer ring core formed in a cylindrical shape and to be joined to outer circumferential surfaces of the plurality of teeth,
slots formed between the adjacent teeth of the stator core each have a circumferential direction width on an inner circumference side of the slots smaller than a circumferential direction width on an outer circumference side of the slots so that a circumferential direction width of the teeth is substantially constant along the radial direction, and
the stator coils are composed of a plurality of connected conductive coils obtained by shaping a conductive wire, the conductive coils including a plurality of slot accommodated portions placed in the slots, and a plurality of coil end portions connecting the plurality of slot accommodated portions outside the slots, the manufacturing method comprising:

an insertion placement step of forming the plurality of the conductive coils into a cylindrical shape and inserting the slot accommodated portions between the teeth at the same time by collectively compressing all the slot accommodated portions placed in the most outer layer from an outer side in the radial direction of the inner ring core after the slot accommodated portions are placed on the outer circumferential side in the radial direction outside the slots, thereby placing the plurality of conductive coils in the slots of the inner ring core;
a core coupling step of joining and attaching the outer ring core to an outer circumferential surface of the inner ring core in which the plurality of conductive coils are inserted and placed; and
a joining step of joining terminal portions of the plurality of conductive coils to form the stator coil.

2. The manufacturing method for the rotary electric machine according to claim 1, wherein
the slot accommodated portions are shaped to have a sectional shape different from a sectional shape of the conductive wire so that a space factor of the plurality of the slot accommodated portions placed in the same slot increases, the manufacturing method comprising:
setting the plurality of the conductive wires to be placed in the same slot, in a mold matched to a shape of the slot, and collectively pressurizing the plurality of conductive wires, thereby shaping the slot accommodated portions.

3. The manufacturing method for the rotary electric machine according to claim 2, wherein
each conductive wire has an insulating coat formed with enamel baked on a surface thereof, and
through the collective pressurization, a thickness of the insulating coat at a corner in a cross section thereof becomes greater than at the other part.

4. The manufacturing method for the rotary electric machine according to claim 1, wherein
the conductive coil is a hexagonal coil formed with the conductive wire shaped substantially into a hexagonal shape while being wound by lap winding, the hexagonal coil including, as the slot accommodated portions, a first slot accommodated portion and a second slot accommodated portion each composed of the plurality of the conductive wires,
the second slot accommodated portion being placed in the slot different from the slot in which the first slot accommodated portion is placed.

* * * * *